Figure 1:
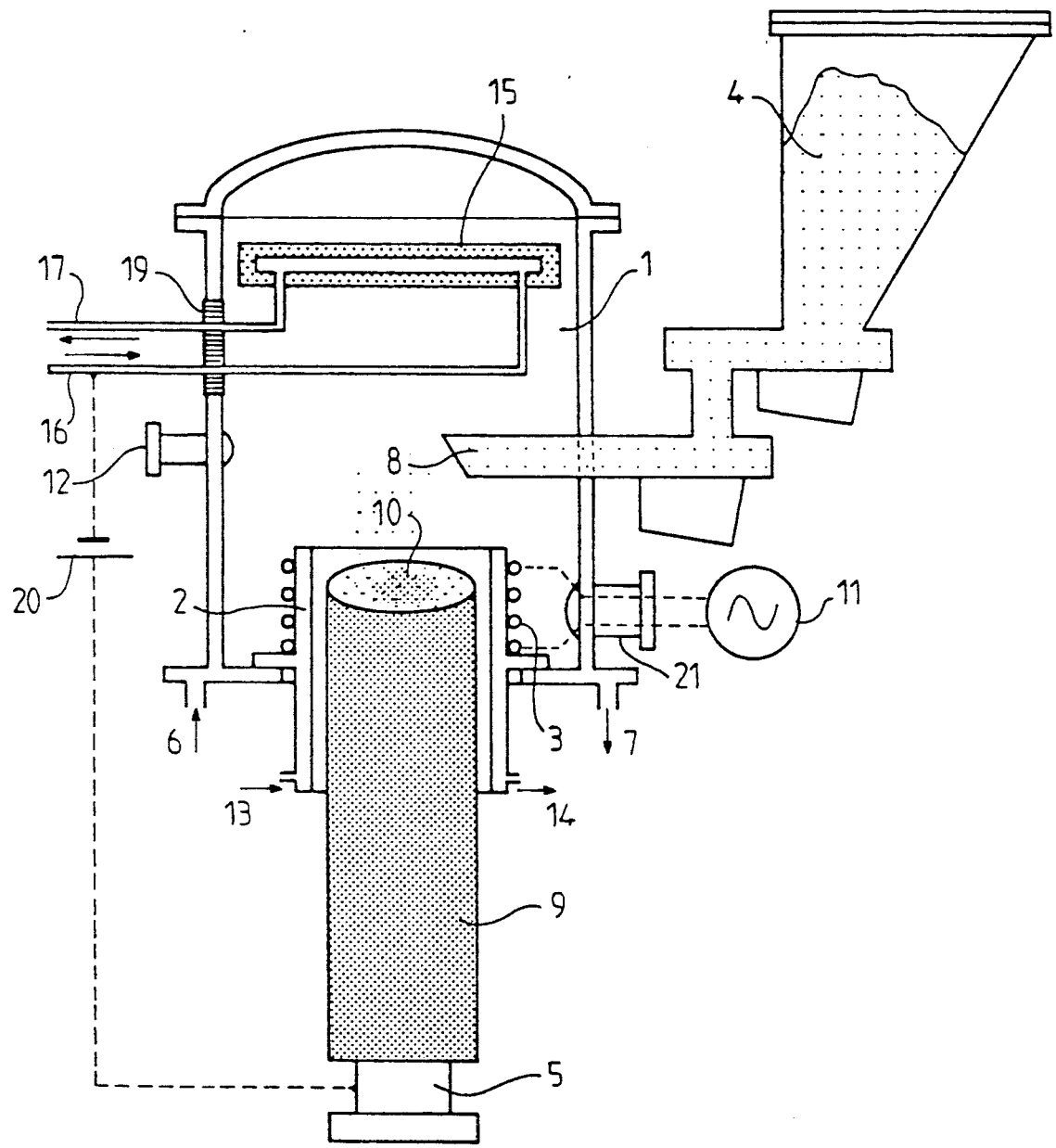

United States Patent [19]

D'Obrenan et al.

[11] Patent Number: 5,127,941
[45] Date of Patent: Jul. 7, 1992

[54] PROCESS AND DEVICE FOR SEPARATING THE CONSTITUENTS OF AN ALLOY

[75] Inventors: Jean V. D. B. D'Obrenan, Le Chesnay; Marcel Garnier, Uriage, both of France

[73] Assignee: Jeumont-Schneider, France

[21] Appl. No.: 541,630

[22] Filed: Jun. 21, 1990

[30] Foreign Application Priority Data

Jun. 22, 1989 [FR] France ............... 89 08345

[51] Int. Cl.⁵ .............................. C22B 7/00
[52] U.S. Cl. ........................ 75/588; 266/44; 266/89; 266/90; 266/146
[58] Field of Search .............. 75/588; 266/44, 89, 266/90, 146

[56] References Cited

U.S. PATENT DOCUMENTS

| | | | |
|---|---|---|---|
| 2,331,988 | 10/1943 | Loevenstein | 75/588 |
| 3,484,233 | 12/1969 | Bonilla | 75/588 |
| 3,632,334 | 1/1972 | Quintin | 75/588 |
| 3,775,091 | 11/1973 | Clites et al. | 75/65 |
| 3,778,044 | 12/1973 | Brown | 75/588 |

Primary Examiner—Peter D. Rosenberg
Attorney, Agent, or Firm—Rines & Rines

[57] ABSTRACT

The invention relates to a process for separating the constituents of an alloy, especially an alloy comprising a refractory base metal and at least one nonrefractory additive metal, which consists in:
  heating said alloy by means for preferably continuous melting and casting of metals, while avoiding any chemical action on said alloy, and to at least one temperature and under controlled atmosphere permitting the boiling of at least one additive metal,
  collecting the distillation vapors of at least one additive metal, and
  collecting, at the exit of said means for preferably continuous melting and casting, the substance resulting from the removal of at least one additive metal from the alloy.

It also relates to a device for separating the constituents of an alloy comprising a refractory base metal and at least one nonrefractory additive metal.

27 Claims, 4 Drawing Sheets

PROCESS AND DEVICE FOR SEPARATING THE CONSTITUENTS OF AN ALLOY

The invention relates to a process for separating the constituents of an alloy, capable especially of being applied to alloys comprising a refractory base metal and at least one nonrefractory additive metal.

It also relates to a device for separating the constituents of an alloy.

Throughout the description "refractory metal" will be understood to mean a metal whose melting temperature is such that the melting cannot be carried out in a crucible with a conventional lining and that it is therefore higher than approximately 2,000° C. If reference is made to the boiling temperature at normal pressure, this is higher than approximately 3,500° C.

The invention is therefore not limited to this particular type of alloy. However, it is chiefly of interest in the case of the latter.

Various processes for separating the constituents of an alloy are known, and especially processes employing the industrial technique of evaporation of melting metals under reduced pressure.

Hitherto this technique has been applied to metals with a low melting temperature. Thus, the separation of lead and zinc in a distillation column can be mentioned as an example of the use of evaporation of metals dissolved in a base metal in order to refine this base metal.

In the case of distillation, the heating of the melting bath is obtained by a Joule effect and especially using flame. The maximum temperature capable of being obtained is of the order of 1,800° C.

This known process, applicable to metals with a low melting temperature, is therefore not suitable for alloys comprising a refractory metal.

This technique has also been employed in the field of isotope separation, using photoionization and precipitation under an electromagnetic field, to produce nuclear fuel. This process consists in melting uranium in a crucible using electron bombardment and then separating the $^{235}U$ and $^{238}U$ molecules by applying an electromagnetic field.

Since this separation is permitted by the difference in molecular mass between the $^{235}U$ and $^{238}U$ molecules, it could also be applied to an alloy.

However, this process is much too complex and costly to make it possible, from an industrial viewpoint, to envisage applying it to alloys.

It can also be noted that this technique has been employed in the context of a process permitting the metal coating of the surface of substrates, metallic or otherwise, to impart to them physical and chemical characteristics resembling those of the added metal, while having the benefit of some advantages due to the thinness of the deposit.

This process is known by the name of VPD (vapor phase physical deposits). The additive metal or alloy is melted by an electrical process (inductor, Joule effect or electron bombardment) in order to be preferentially transferred onto the support without any change in composition if possible, when alloys are involved.

Its objective is completely different from that of the invention, since it involves transforming the surface quality of a support by its metallizing, for example to combat corrosion or to create a reflective surface, and not separating the constituents of an alloy.

It may be noted that in these various processes the methods of heating the melting bath are: electron bombardment, induction or the Joule effect, the latter being set apart for metals with a low melting point.

The objective of the invention is to propose a process and a device for separating constituents of an alloy, employing the technique of the evaporation of molten metals under reduced pressure, these being applicable to alloys exhibiting a high melting temperature and being relatively simple and inexpensive.

The process and the device according to the invention make it necessary to heat the alloy which it is desired to refine. Various processes for melting metal are in existence.

Special mention may be made of the techniques of melting in a cold crucible with heat transfer by induction, optionally under a controlled atmosphere, which are now quite well known and form the subject of first industrial applications. They enable the most refractory metals to be melted while ensuring an efficient stirring of the molten mass.

Insofar as these melting techniques are concerned, the invention refers especially to the techniques described by U.S. Pat. No. 3,775,091, FR 2,497,050 and Patent Application FR 87 00,814.

In a first category of equipment, illustrated especially by Patent FR 2,497,050, the metal melted in the cold crucible can be removed progressively via an ingot mould, frequently situated under the crucible. The latter ensures the melting, the solidification taking place in the channel. Physicochemical attack on the channel wall can be avoided by causing the formation of a clinker, a film of which, solidified along the wall, ensures that the latter is protected. It can also be avoided by electromagnetic confinement by means of an auxiliary alternating magnetic field which ensures a slight detachment of the molten mass along the wall.

In a second category of equipment, illustrated especially by U.S. Pat. No. 3,775,091 and Patent Application FR 87 00,814, (publication No. 2 609 655) metal in the solid state can be removed progressively by drawing downwards.

In this second category there are known devices in which the shape of the crucible and the design of the induction solenoid are such that the following are ensured simultaneously:

melting under a controlled atmosphere without clinker, detachment of the molten mass over practically the whole wall, detachment of the solidified mass in the pouring channel, without it being necessary to ensure confinement using a field and an auxiliary magnetic field generator.

These devices are of great interest in the operations of continuous melting and casting of metals and alloys characterized by:

either their high melting temperature, or their chemical reactivity towards the walls, or the contaminating nature of their vapor.

These devices do not make it necessary to employ clinker, which has the disadvantage of being volatile or even contaminating.

Their applications are to be found particularly for the recovery of scrap noble metals such as titanium and are being tested for reducing the volume of nuclear fuel cladding (Zircalloy) using melting and without modifying their chemical composition and hence their radioactivity.

These devices and their predecessors from which they are derived have all a point in common; they are designed and employed:

either for melting or remelting refractory metal oxides or metals without modifying they chemical composition (except for a possible release of a fraction of atmospheric oxygen and nitrogen which are dissolved or adsorbed), or for the production of metals by a direct reduction of oxides or heating metal halides with calcium.

The devices which have just been referred to make it therefore possible to melt an alloy exhibiting an high melting temperature, while avoiding any chemical action, be it due to the use of a clinker or to the attack on the crucible walls.

This is why they are preferably employed for effecting the heating of the alloy within the scope of the process according to the invention. Similarly, the device according to the invention preferably incorporates their constituent components.

The invention relates therefore to a process for separating the constituents of an alloy, especially an alloy comprising a refractory base metal and at least one nonrefractory additive metal, which consists in:

heating said alloy by means for preferably continuous melting and casting of metals, while avoiding any chemical action on said alloy, and to at least one temperature and under controlled atmosphere permitting the boiling of at least one additive metal, collecting the distillation vapors of at least one additive metal, and collecting, at the exit of said means for preferably continuous melting and casting, the substance resulting from the removal of at least one additive metal from the alloy.

Insofar as the distillation vapors are collected on a cold structure, the process subsequently consists in detaching said condensed additive metal (metals) from this structure.

According to a first alternate form of the process according to the invention, when said alloy comprises at least two additive metals, the temperature of heating of said alloy is chosen so as to permit the simultaneous boiling of all the additive metals, the distillation vapors of all the additive metals being then collected simultaneously.

According to a preferred embodiment of this first alternate form, the additive metals are separated from each other after having been detached from the cooled structure onto which they have simultaneously condensed.

According to a second alternate form of the process according to the invention, when said alloy comprises at least two additive metals, the heating of said alloy, optionally depleted in at least one additive metal, is ensured successively under controlled atmosphere and at different temperatures, permitting the selective boiling of each additive metal.

According to a preferred embodiment of this second alternate form, the heating is performed so as to obtain the boiling of the additive metals in an increasing order of the corresponding boiling temperatures.

Moreover, preferably, each condensed additive metal is detached from said structure after the heating corresponding to its boiling temperature and before proceeding with the heating of the alloy depleted in at least one additive metal to a temperature permitting the boiling of another additive metal.

Said cooled structure is preferably taken to a direct electrical potential which is negative relative to the molten metal bath.

The invention also relates to a device for separating the constituents of an alloy comprising a refractory base metal and at least one nonrefractory additive metal, which comprises:

means for feeding the alloy, means for preferably continuous melting and casting of metals, comprising means producing the melting of said alloy while avoiding any chemical action thereon and means for collecting the cold ingot, means for collecting the distillation vapors of at least one additive metal, and at least one chamber with a controlled atmosphere insulating from the atmosphere at least the content of said means producing the melting of said alloy.

Said means producing the melting of said alloy preferably comprise a crucible containing the molten metal bath and an inductor.

Said crucible is preferably cooled by suitable means.

According to a preferred embodiment, said means for collecting the distillation vapors of at least one additive metal consist of a structure cooled by suitable means.

This cooled structure can take the form of a plate, a coil or a hollow cylinder.

According to another preferred embodiment, said chamber is connected to a vacuum pump by means of connecting means.

Said chamber is preferably cooled by suitable means.

According to an example of embodiment, the chamber is double-walled, carrying a coolant fluid.

The device according to the invention preferably comprises an annex chamber communicating with said chamber via a conduit.

Said annex chamber is preferably cooled by suitable means.

According to an example of embodiment, said annex chamber is double-walled, carrying a coolant fluid.

It may be noted that the temperature of the coolant fluid associated with the chamber or with the annex chamber is preferably higher than that of a fluid responsible for cooling said cooled structure.

According to a first embodiment of the device according to the invention, said cooled structure is placed in said chamber.

According to a second embodiment of the device according to the invention, said cooled structure is placed in said annex chamber.

The device according to the invention preferably comprises means for taking said cooled structure to a direct electrical potential which is negative relative to the molten metal bath.

These means preferably consist of a direct current generator, the cooled structure being insulated from the walls of the chamber or of the annex chamber and from the crucible by a component.

Figure 2:
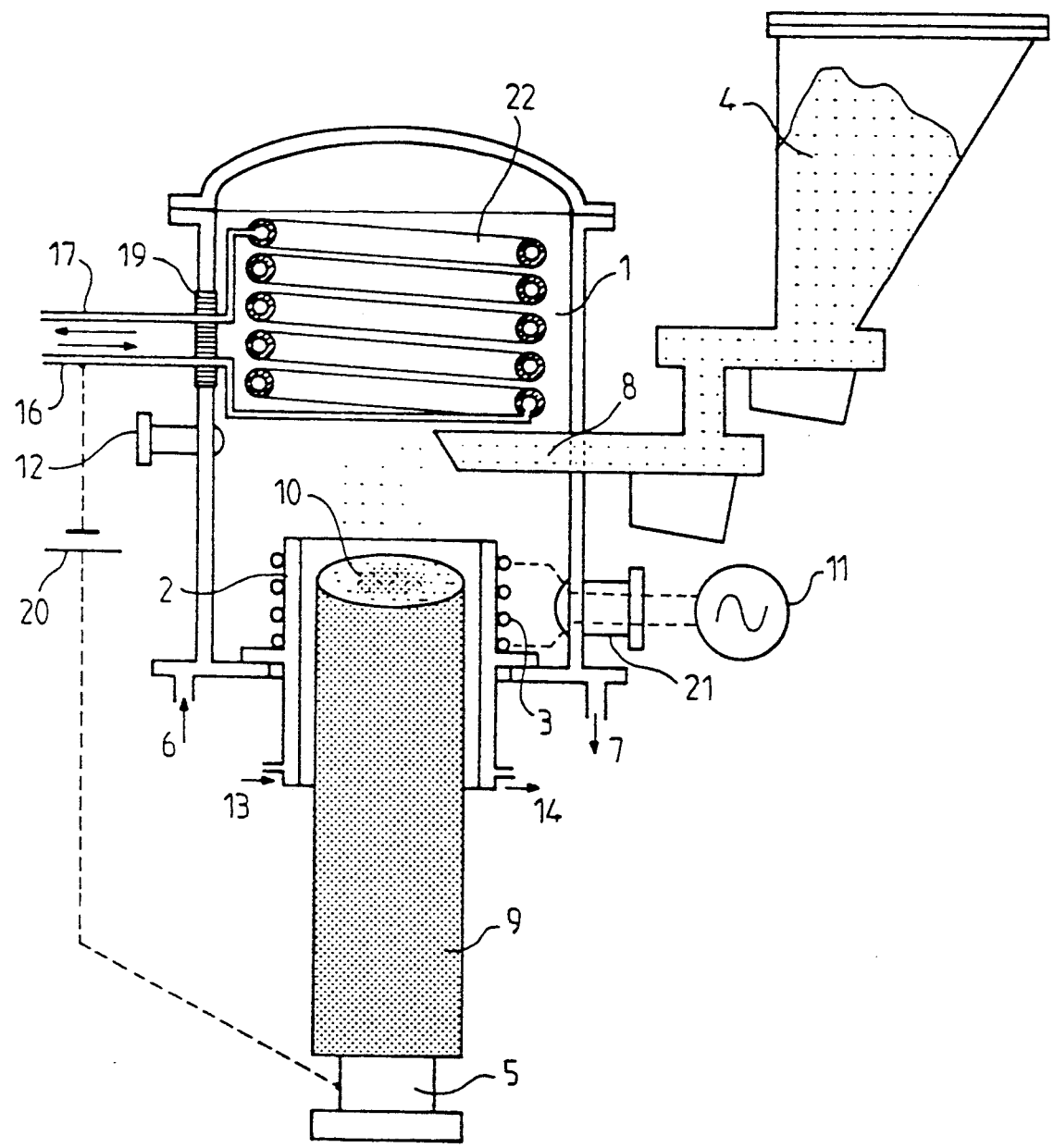
Figure 3:
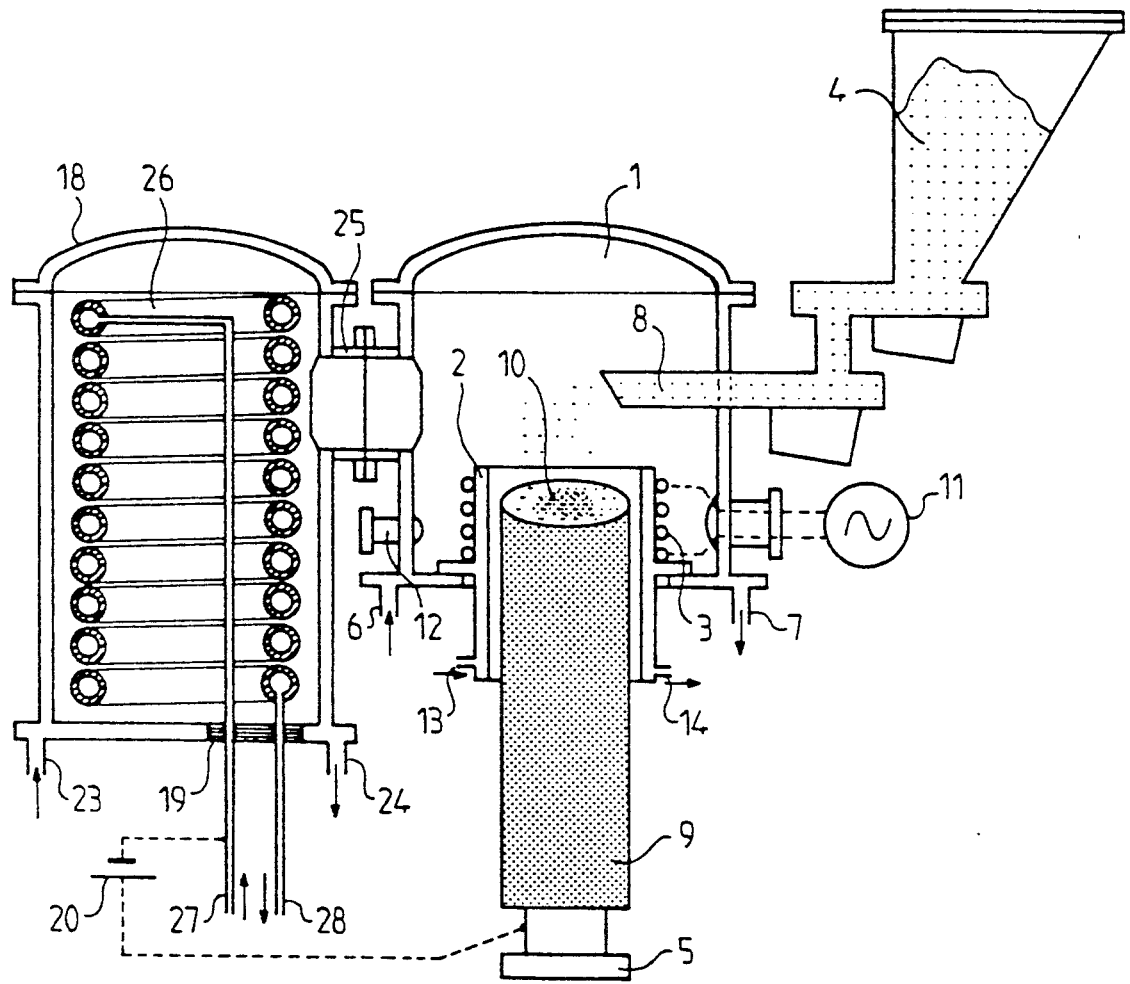
Figure 4:
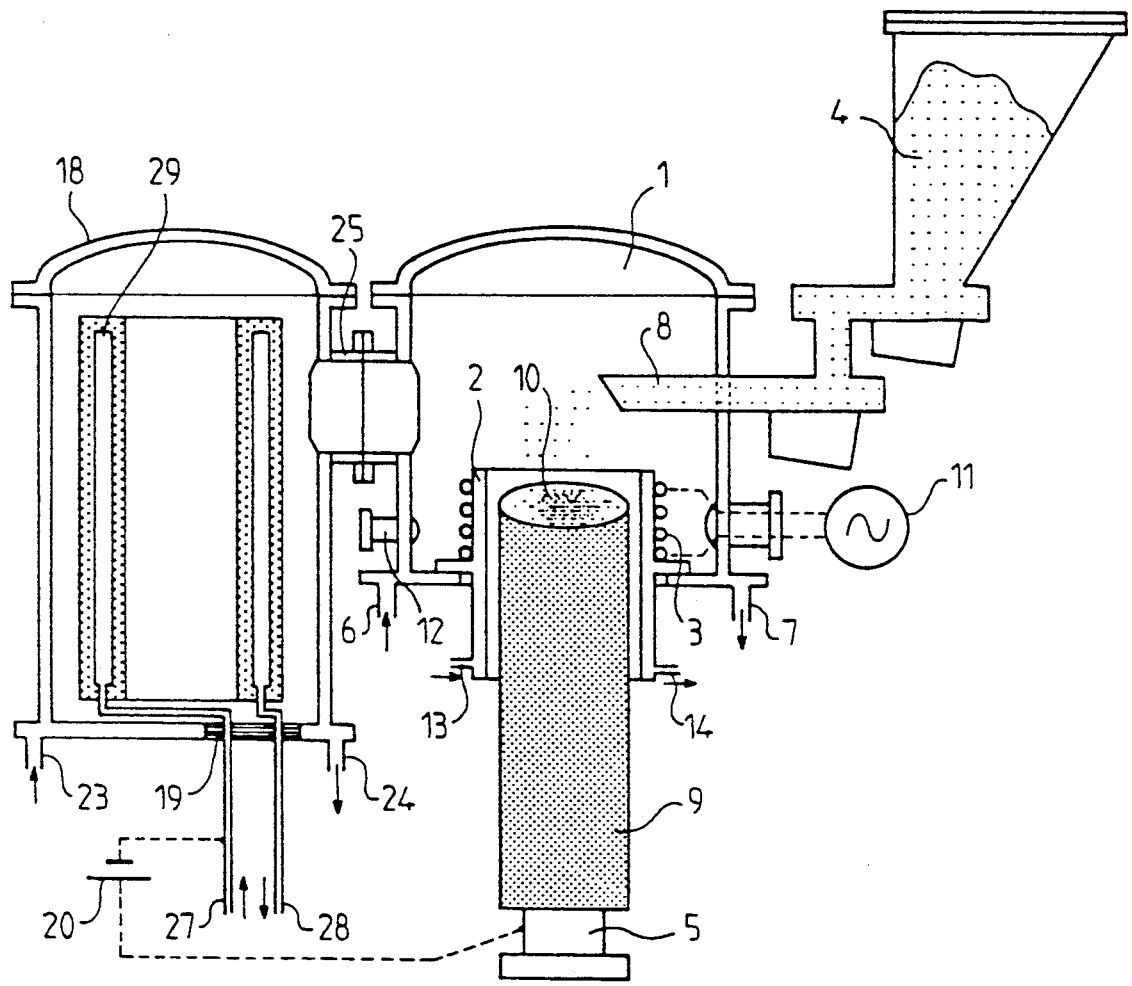

The invention will be better understood, and other objectives, advantages and features thereof will appear more clearly on reading the description which follows. Attached to this description are figures which represent, without implying any limitation, particular embodiments of the device according to the invention, in which:

FIG. 1 shows a diagrammatic sectional view of a first alternate form of a first embodiment of the invention, FIG. 2 shows a diagrammatic sectional view of a second alternate form of a first embodiment of the invention, FIG. 3 shows a diagrammatic sectional view of a first alternate form of a second embodiment of the invention, and FIG. 4 shows a diagrammatic sectional view of a second alternate form of a second embodiment of the invention.

Components which are common to the various figures will be indicated using the same references.

With reference to FIG. 1, the device according to the invention comprises a chamber 1, called furnace chamber, with controlled atmosphere, which allows at least the content of the crucible 2 to be isolated from the atmosphere.

The double walls of the chamber 1 are cooled by a cooling device, of which only the entry 6 and outlet 7 conduits for a coolant fluid circulating within the double walls are shown in the figure. Chamber 1 is connected to a vacuum pump, not shown in the figure, by means of connecting means 12.

The crucible 2, also double-walled, is cooled by another suitable device, of which only the entry 13 and exit 14 conduits for the fluid for cooling the crucible are shown.

It is surrounded, over a part of its height, by an inductor 3 with helical windings which is fed by a frequency converter 11 connected to the inductor by known means 21.

The device additionally comprises a hopper 4 containing the products to be treated, to which a feed system is connected. The latter ends in a feed conduit 8, one end of which is placed in the chamber 1, above the upper part of the crucible 2, thus enabling the products to be treated to be introduced easily therein.

In the example shown, the hopper 4 is situated outside the chamber 1. This means that a sealed connection must be provided between the conduit 8 and the corresponding wall of the chamber 1. The hopper can just as well be placed inside the chamber. This second arrangement is simpler from the viewpoint of the manufacture of the device, since the sealed connection is then no longer needed.

Reference 10 denotes the mass of melting metal and reference 9 the ingot of remelted metal.

The device comprises a system 5 for the continuous extraction of the cold ingot.

The crucible 2, the inductor 3 and the extraction system 5, which constitute a device for continuous melting and casting of metals, are such that they make it possible to melt an alloy whose melting temperature is high while avoiding any chemical action, be it due to the use of a clinker or to the attack on the walls of the crucible.

The device finally comprises a plate 15 which can take the form especially of a disk. It is here placed in the upper part of the chamber 1.

The plate 15 is provided with internal channels for circulating fluid and is cooled by a suitable device, of which only the entry 16 and exit 17 conduits for the coolant fluid are shown.

The plate 15 can be optionally insulated electrically from the enclosure of the chamber 1 and from the crucible 2 by a component 19 which is responsible for the mechanical continuity and the sealing of the chamber.

A direct current generator 20, which can be controlled electronically is then connected between the plate 15 and the crucible 2 so as to take the plate 15 to a direct electrical potential which is negative relative to the molten metal bath. The advantage and the operation of this particular arrangement will be described in the description which follows.

The device according to the invention as shown in FIG. 2 differs from that just described only in the replacement of the plate 15 by a coil 22 cooled, as before, by a suitable device.

The devices according to the invention as shown in FIGS. 3 and 4 differ from those described with reference to FIGS. 1 and 2 in that the cooled structure is no longer situated inside the chamber 1 but in an annex chamber 18.

This annex chamber consists here chiefly of a cylindrical body, also double-walled, and cooled by a suitable device. Only the inlet 23 and exit 24 conduits for the coolant fluid are shown in FIGS. 3 and 4.

A conduit 25 is provided for bringing the chambers 1 and 18 into communication. The chamber 18 itself therefore also has a controlled atmosphere.

With reference to FIG. 3, a coil 26 is placed in the annex chamber 18 and cooled by a suitable device of which only the entry 27 and exit 28 conduits for the coolant fluid are shown.

In the device shown in FIG. 4 the coil 26 is replaced by a double-walled hollow cylinder 29 whose inner and outer walls are themselves also cooled by a suitable system.

It may be noted that in the various devices just described the walls of the chamber 1 and of the chamber 18, if this is provided, carry a coolant fluid whose temperature is higher than that of the coolant fluid associated with the cooled structure (plate 15, coils 22 or 26 or cylinder 29).

By way of indication, it suffices for the temperature of the fluid for cooling the walls of the chamber 1 to be lower than 90° C. while the temperature of the coolant fluid associated with the cooled structure is, for example, of the order of 7° C.

The process according to the invention will now be described in relation to the device according to FIG. 1. It can be easily applied to the other devices which are described in relation to FIGS. 2 to 4. Moreover, it is clear that the process according to the invention is not limited to its application to the examples of embodiment of the devices according to the invention which have been described.

The crucible 2 is fed with alloy by means of the hopper 4 and of the feed conduit 8.

As indicated above, the device for continuous melting and casting of metals which is chosen, and which comprises the crucible 2, the inductor 3 and the system 5 for extracting the cold ingot downwards, makes it possible to ensure the melting of an alloy whose melting temperature is high, while avoiding any chemical action.

This device operates continuously. In steady-state operation the feed to the crucible and the extraction of the cold ingot are accurately controlled, the crucible thus containing a relatively constant quantity of metal.

The distillation of the alloy is initiated by a suitable control of the inductor 3, of the pressure and of the chemical composition of the atmosphere inside the chamber 1.

The control may be carried out so as to permit the simultaneous boiling of all the additive metals present in the alloy. The metal vapors then condense on the plate 15.

In the case of the other devices described, they condense on the coil 22 or 26 or else on the inner and outer walls of the cylinder 29.

It may be noted that during the distillation the system 5 permits a cold ingot consisting solely of the alloy-based metal to be extracted from the crucible, the additive metals having been removed as a result of the distillation.

When the distillation has ended, that is to say when the whole quantity of alloy which it is desired to refine has passed through the crucible 2, the condensed vapors are separated off from the cooled structure 15.

The separation of the various additive metals can then be undertaken using all the means known to a specialist, insofar as the alloy comprises at least two additive metals.

The control can also be carried out, wherever the alloy comprises at least two additive metals, so as to obtain directly a fractional distillation of the additive metals and not, as previously, an overall distillation followed by a stage of separating the additive metals. In this case, the control is provided so as to heat the alloy initially to a first temperature and under controlled atmosphere permitting the boiling of a first additive metal.

When the whole quantity of alloy to be distilled has passed through the crucible 2, the condensed vapors of the first additive metal are separated from the cooled structure.

The cold ingot extracted from the crucible 2 consists of the initial alloy depleted in the first additive metal.

The crucible 2 is then fed with alloy depleted in the first additive metal and the inductor 3, the pressure and the composition of the atmosphere inside the chamber 1 are controlled so as to obtain the boiling of a second additive metal.

As in the preceding stage, when all the depleted alloy has passed through the crucible, the condensed vapors of the second additive metal are separated from the cooled structure.

The cold ingot extracted from the crucible 2 consists of the initial alloy depleted in the first and second additive metals.

The procedure is thus followed in successive stages until all the additive metals have been extracted from the initial alloy, the cold ingot extracted from the crucible 2 then consisting solely of the alloy-based metal.

It is understood that it is preferable to perform the heating of the alloy, which may be depleted, so as to obtain the boiling of the additive metals in an increasing order of the corresponding boiling temperatures.

This ensures, in fact, that only one additive metal is extracted from the alloy, which may be depleted, at each heating stage.

It may be noted that it will not always be possible to proceed directly with a fractional distillation of an alloy, especially when the differences between the boiling temperatures of the various additive metals are insufficient.

In the processes just described it may be noted that atmospheric pressure will be preferably controlled so as to avoid a substantial loss of the base metal by evaporation and its chemical composition chosen to prevent the formation of oxides, nitrides, hydrides, and the like.

An example of the application of the process according to the invention which may be mentioned is Zircaloy, whose constituents have the following boiling points at atmospheric pressure:

| | |
|---|---|
| zirconium | 4,337° C. |
| iron | 2,750° C. |
| chromium | 2,672° C. |
| nickel | 2,732° C. |
| tin | 2,270° C. |

By way of example, a plant according to FIG. 1 can have a chamber 1 approximately 500 mm in height and 500 mm in internal diameter; a crucible 2 approximately 250 mm in height, 130 mm in external diameter and 100 mm in internal diameter, a feed conduit 8 approximately 50 mm in diameter, and a hopper approximately 500 mm in height with an exit section at its base approximately 200 mm in width and an entry section, at its upper end, approximately 400 mm in width.

So far as a typical flow of materials is concerned, in a crucible with an internal diameter of 100 mm, remelting divided materials, the speed of extraction of the ingot 9 can attain 3 meters per hour, with an extraction system 5 power of the order of 100 kW.

In the case where the cooled structure is placed inside the chamber 1, as, for example, the plate 15 in FIG. 1 or the coil 12 in FIG. 2, it is dismantled before the additive metal(s) can be separated from it. The separation is therefore performed outside the chamber 1.

When the cooled structure is placed inside the annex chamber 18, like, for example, the coil 26 or the cylinder 29, the annex chamber is easily separated from the chamber 1 and it can then be replaced with another annex chamber and a new heating stage can be immediately undertaken.

After it is dismantled, the cooled structure can be freed from its condensation deposits, which are in the form of "crusts" by a mechanical (impacts or vibration) or thermal (thermal shock) process known to a specialist.

The process of collection and of treatment of the additive metals will not be described in greater detail here.

The cooled structure employed has a suitable shape which enables it to match the internal profile of the chamber 1 or of the annex chamber 18, permitting the dismantling operations and the passage of the coolant fluid pipework.

The means for dismantling the cooled structures have not been shown in the figures; they are within the reach of a specialist.

It may be noted that structures made up of a bundle of tubes can be employed instead and in the place of the coils if there is advantage in reducing the heating of the coolant fluid (and thus the unevenness of temperature along the cooled structure) at the expense of its flow rate.

As already seen, the double-walled chamber(s) carries(carry) a coolant fluid at a temperature which is higher than that of the fluid circulating in the cooled structures.

The shape and the dimensions of the chamber(s) are adapted as needed to permit good circulation of the fluids and easy dismantling of the wear components and also to take into account the heat effects of the radiation from the molten mass.

We have already seen that it is possible to raise the cooled structure 15, 22, 26, 29 to a direct electrical potential which is negative in relation to the molten metal bath 10.

This can be ensured by connecting the negative terminal of the generator 20 to the electrically conductive entry conduit, 16 or 27, of the circuit for cooling the plate 15 (FIG. 1), the coil 22 (FIG. 2) or 26 (FIG. 3) or the hollow cylinder 29 (FIG. 4), respectively, these being all electrically conductive, while the positive terminal of the generator 20 is connected to the extraction system.

This polarization according to a known effect commonly known as "ion deposition", produces an ionization with the flow of a current which is controlled as needed, and accelerates and promotes the deposition and the condensation of the metal vapors on the metal substrates. However, this assumes that the absolute pressure can be reduced below approximately 1 pascal, the atmosphere being inert, consisting, for example, of argon. This is perfectly compatible with the mechanical arrangements described above.

A known property of ion deposits is their high adhesiveness to the substrate which receives them. In the present case this may be a disadvantage; this is why it is proposed to produce the ion deposition using the application of direct voltage only after a relatively nonadherent first layer has already been formed.

Thus, this particular arrangement with a direct current generator 20 makes it possible to accelerate the transfer of metals towards the cooled structure and to combat the risks of interfering depositions on the other parts of the plant.

The invention is especially capable of being applied to:

any operations of refining of refractory metals of high added value, the recovery of additive metals in alloy wastes, and to the reduction or the removal of radioactivity from metal wastes, when it is additive metals (with a high "effective capture cross-section") and not the base metal (with a low "effective capture cross-section") which are the source of the radioactivity.

This third application forms the basis of a new formula for retreatment of fuel cladding, made of Zircalloy, irradiated in pressurized water nuclear power stations.

Its objective is to avoid the costly long-term underground storage of a major part of the mass of these wastes.

Zircalloy contains a high proportion of zirconium (96 to 97%) and the additive metals are iron, tin, chromium and sometimes nickel. Their effective capture cross-section for thermal neutrons is from 4 to 40 times higher than that of pure zirconium. Calculation shows that zirconium freed from these additive metals will be only slightly radioactive.

The ingot 9 originating from the continuous casting will be low in activity and will be capable of being employed after a short-term safety storage.

The additive metals solidified on the cooled structure provided will be high in activity and will be handled and stored as such. However, their mass should not exceed 4 to 5% of the total mass to be treated.

It should be noted that the process according to the invention employs positively what is a disadvantage in the remelting of the volatile metals or alloys in which they are present. Thus, in the remelting in order to fabricate chromium from divided electrolytic chromium, an intense evaporation of chromium takes place, vapors of which condense on the walls of the cooled enclosure. The same applies to aluminum in the production of niobium-based alloys in a cold crucible.

The reference signs inserted after the technical features stated in the claims are solely intended to facilitate the understanding of the latter and cannot in any event have the effect of limiting the operation to the particular embodiments which have just been described.

We claim:

1. A process for retreatment of a radioactive alloy comprising a base metal with a relatively low effective captural cross section and additive metals with a relatively high effective captural cross section, wherein the alloy has a base metal of refractory metal, which consists in:

heating said alloy by continuous melting and casting of the metals, while avoiding any chemical action on said alloy, and to at least one temperature and under controlled atmosphere, permitting the boiling of at least one additive metal, collecting the distillation vapors of such one additive metal, and collecting at the exit of said continuous melting and casting a cooled substance resulting from the removal of at least such one additive metal form the alloy and of reduced radio activity.

2. The process as claimed in claim 1, wherein, the distillation vapors being collected on a cooled structure, the condensed additive metal (metals) is (are) separated from said structure.

3. The process as claimed in either of claims 1 and 2, wherein, said alloy comprising at least two additive metals, the temperature of heating of said alloy is chosen so as to permit the simultaneous boiling of all the additive metals, the distillation vapors of all the additive metals being then collected simultaneously.

4. The process as claimed in claim 3, wherein said two additive metals are separated after they have been separated from said structure.

5. The process as claimed in either of claims 1 and 2, wherein, said alloy comprising at least two additive metals, the heating of said alloy, possibly depleted in at least one additive metal, is effected successively under controlled atmosphere and at different temperatures, permitting the selective boiling of each additive metal.

6. The process as claimed in claim 5, wherein the heating is carried out so as to obtain the boiling of the additive metals in an increasing order of the corresponding boiling temperatures.

7. The process as claimed in claim 5, wherein each condensed additive metal is separated from said structure after the heating corresponding to its boiling temperature and before proceeding with the heating of the alloy, depleted in at least one additive metal, to a temperature permitting the boiling of another additive metal.

8. The process as claimed in claim 2, wherein said cooled structure is taken to a direct electrical potential which is negative relative to the molten metal bath.

9. A device for separating the constituents of a radioactive alloy comprising a refractory base metal and at least one nonrefractory additive metal, which comprises:

means (4) for feeding an alloy, means for continuous melting and casting of metals, comprising means (2, 3) ensuring the melting of said alloy while avoiding any chemical action on the latter and means (5) for collecting the cold ingot (9), means (15, 22, 26, 29) for collecting the distillation vapors of at least one additive meal, and at least one chamber (1) with a controlled atmosphere isolating from the atmosphere at least the content of said means (2, 3) responsible for melting said alloy.

10. The device as claimed in claim 9, wherein said means (2, 3) responsible for melting said alloy comprise a crucible (2) containing the molten metal bath (10) and an inductor (3).

11. The device as claimed in claim 10, wherein said crucible (2) is cooled by suitable means.

12. The device as claimed in claim 9, wherein said means (15, 22, 26, 29) for collecting the distillation vapors of at least one additive metal consist of a structure cooled by suitable means.

13. The device as claimed in claim 12, wherein said cooled structure is a plate (15), a coil (22, 26) or a hollow cylinder (29).

14. The device as claimed in claim 9, wherein said chamber (1) is connected to a vacuum pump by mean of connecting means (12).

15. The device as claimed in claim 9, wherein said chamber (1) is cooled by suitable means.

16. The device as claimed in claim 15, wherein the chamber (1) has double walls carrying a coolant fluid.

17. The device as claimed in claim 12, wherein said device comprises an annex chamber (18) placed in communication with said chamber (1) via a conduit (25).

18. The device as claimed inc alim 17, wherein said annex chamber (18) is cooled by suitable means.

19. The device as claimed in claim 18, wherein said annex chamber (18) has double walls carrying a coolant fluid.

20. The device as claimed in claim 17, wherein the temperature of the coolant fluid associated with the chamber (1) or with the annex chamber (18) is higher than that of the coolant fluid associated with said cooled structure (15, 22, 26, 29).

21. The device as claimed in claim 12, wherein said cooled structure (15, 22) is placed in said chamber (1).

22. The device as claimed in claim 17, wherein said cooled structure (26, 29) is placed in said annex chamber (18).

23. The device as claimed in claim 17, which comprises means (20) for taking said cooled structure (15, 22, 26, 29) to a direct electrical potential which is negative relative to the molten metal bath (10).

24. The device as claimed in claim 23, wherein said means (20) consist of a direct current generator (20), the cooled structure (15, 22, 26, 29) being insulated from the walls of the chamber (1) or of the annex chamber (18) and from the crucible (2) by a component (19).

25. The process as claimed in claim 1, wherein said base metal is of zirconium and the additive metals are selected from the group consisting of iron, tin, chromium and nickel, with the zirconium substance freed from the additive metals exhibiting only slight radio activity.

26. The process as claimed in claim 25 wherein the collecting of the distillation vapors is effected on a cooled structure.

27. The process as claimed in claim 1 and in which said melting is effected in a cold crucible with magnetic levitation applied to prevent the melting metals from contacting the crucible.

* * * * *